United States Patent [19]
Cole et al.

[11] Patent Number: 5,321,213
[45] Date of Patent: Jun. 14, 1994

[54] DOWNHOLE EPICYCLIC MOTION ORBITAL SEISMIC SOURCE

[75] Inventors: Jack H. Cole; Paul L. Buller; John B. Sinton, all of Ponca City; Marvin E. Janda, Kildare, all of Okla.

[73] Assignee: Conoco Inc., Ponca City, Okla.

[21] Appl. No.: 13,263

[22] Filed: Jan. 29, 1993

[51] Int. Cl.[5] .............................. G01V 1/40
[52] U.S. Cl. .................... 181/106; 181/113
[58] Field of Search ............... 181/102, 104, 106, 113; 367/75, 912

[56] References Cited

U.S. PATENT DOCUMENTS

| | | | |
|---|---|---|---|
| 4,709,362 | 11/1987 | Cole | 367/189 |
| 4,874,061 | 10/1989 | Cole | 181/106 |
| 5,159,160 | 10/1992 | Brett | 181/106 |
| 5,166,909 | 11/1992 | Cole et al. | 367/189 |
| 5,229,552 | 7/1993 | Cole | 181/102 |

*Primary Examiner*—Ian J. Lobo
*Attorney, Agent, or Firm*—M. Kathryn Braquet Tsirigotis

[57] ABSTRACT

The present invention relates to an improved downhole seismic source with an epicyclic eccentric weight system for the simultaneous generation of elliptically polarized shear wave seismic energy and compression wave seismic energy coupled into a borehole. The apparatus includes a cylindrical housing and a drive means or electric motor disposed in the housing which provides rotational output to an epicyclic eccentric weight system also disposed in the housing. Expandable tapered wedging collars are used to firmly secure the motor and the epicyclic eccentric weight systems within the housing. A flexible shaft interconnects the centerline of the epicyclic cylindrical roller and the motor whereby the roller receives the rotational output from the motor. The shaft rotates in one direction and the roller rotates in the opposite direction thereby producing an epicyclic motion.

6 Claims, 3 Drawing Sheets

DOWNHOLE EPICYCLIC MOTION ORBITAL SEISMIC SOURCE

BACKGROUND OF THE INVENTION

1. Field of the Invention

The invention relates generally to downhole seismic sources and, more particularly, but not by way of limitation, it relates to an improved type of orbital vibration source with an epicyclic eccentric weight system for generating both shear wave and compression wave energy into an earth medium.

2. Description of the Background Art

Many different types of downhole seismic source mechanisms have been utilized for inducing acoustic energy into a borehole wall and subsequently analyzing velocity and/or phase of received energy to ascertain certain lithologic information. There are currently ongoing efforts in the industry to develop suitable downhole sources for generation of shear waves and/or compression waves with greater power and high signal-to-noise ratios to enable new approaches to seismic data acquisition. Current efforts have taken various forms and utilize diverse mechanisms in attempts to impart a clean, concise seismic energy input through the borehole wall or, in some cases, the well casing, and it is contemplated that development of such sources will open new possibilities of seismic data acquisition and interpretation.

U.S. Pat. No. 4,874,061 issued Oct. 17, 1989 to Cole, entitled "Downhole Orbital Seismic Source" relates to a downhole seismic source for the generation of elliptically polarized seismic shear waves and compression waves in a borehole. The invention uses the sonde casing of a generally cylindrical shape which houses an interactive rotational disk or the like to impart transverse rotational motion through the coupling wellbore fluid into the borehole wall. The invention contemplates a number of different types of basic orbital motion generators including motor driven eccentric disks.

U.S Pat. No. 4,709,362 issued Nov. 24, 1987 to Cole entitled "Oscillating Orbital Vibrator" relates to an orbital vibratory mass used for generating seismic signals and the like. The orbital vibrator comprises a hollow cylindrical reaction mass which is mounted by means of a bearing on a crank shaft. The reaction mass orbitally oscillates relative to the axis of the crank shaft without rotating. The eccentricity of the crank causes the reaction mass to orbitally oscillate about the center line of the shaft in response to the shaft's rotation. Since the reaction mass orbitally oscillates instead of rotating, this reduces the internal forces created in the reaction mass by centrifugal force and enables less exotic, less expensive materials to be used in its construction.

Co-pending U.S. patent application No. 07/954,831 entitled "Downhole Hydraulic Rotary Seismic Source" filed Sep. 29, 1992, relates to an improved type of orbital vibration source with a hydraulic power means for generating both shear wave and compression wave energy into an earth medium. The orbital source features a bearing mounted rotor which is optimized for weight eccentricity to total rotor weight and with minimized rotational wind drag. The source provides distributed force contact between the internal components and the external housing and allows two hydraulic motors with single shafts synchronously to drive two separate rotor assemblies which are located axially such that a tendency to excite a fundamental bending mode is minimized. The invention includes a built in lubricant recirculating system intended to lengthen the life of the rotor bearings.

SUMMARY OF THE INVENTION

The present invention relates to an improved downhole seismic source with an epicyclic eccentric weight system for the simultaneous generation of elliptically polarized shear wave seismic energy and compression wave seismic energy coupled into a borehole. The apparatus of the present invention significantly increases the maximum output frequency over prior downhole apparatus while using state of the art bearings and electric motors.

The apparatus includes a cylindrical housing and a drive means or electric motor disposed in the housing which provides rotational output to a epicyclic eccentric weight system also disposed in the housing. Expandable tapered wedging collars are used to firmly secure the motor and the epicyclic eccentric weight systems within the housing. An armored cable supports the cylindrical housing at selected positions along the borehole.

The epicyclic eccentric weight system includes a cylindrical mounting block with a cylindrical cavity formed along its longitudinal axis. A cylindrical sleeve is bonded inside the cylindrical cavity and a cylindrical roller is slidably disposed within the sleeve and cavity of the mounting block. A crank interconnects the lower end of the roller and the roller mounting block. A flexible shaft interconnects the centerline of the roller and the motor whereby the roller receives the rotational output from the motor. The shaft rotates in one direction and the roller rotates in the opposite direction thereby producing an epicyclic motion.

DETAILED DESCRIPTION OF THE INVENTION

Figure 1:
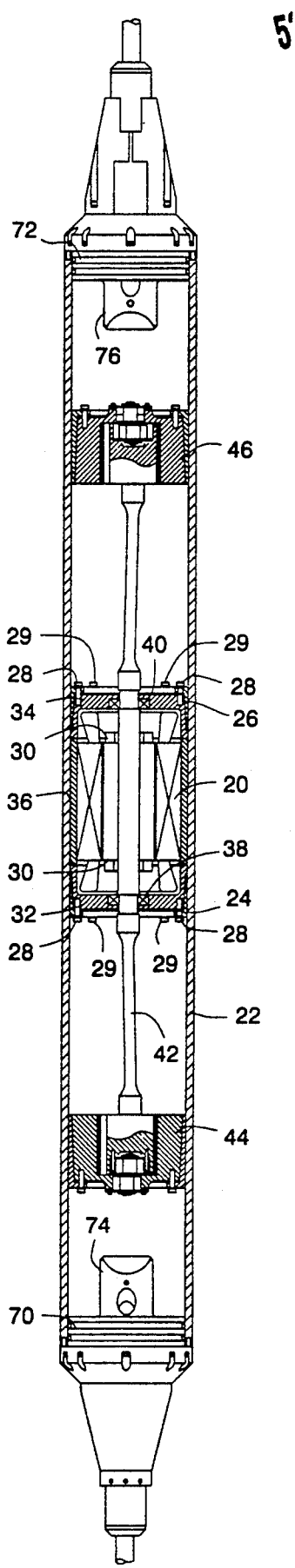
FIG. 1 is a vertical cross-section of a downhole orbital seismic source with two epicyclic eccentric weight systems.

FIG. 1 is a vertical cross-section illustrating the downhole seismic source. The concept illustrated in the present invention significantly increases the maximum output frequency while using state of the art bearings and electric motors. An AC motor 20 is mounted at the center of the cylindrical housing 22 and is held firmly in contact with the wall of the housing by expandable wedging collars 24, 26 at both ends of the motor 20.

As illustrated in FIG. 1, the motor components 20 are arranged in a subassembly which includes double ended shaft subassembly 30, bearing mounts 32, 34 and expandable wedging collars 24, 26. The bearing mounts 32 and 34 are attached to a modified motor shell 36 by arrays of cap screws (not shown). The bearings 38, 40 and the shaft subassembly 30 are captured within and between the two bearing mounts 32, 34. Each bearing mount 32, 34 includes an external 3 degree taper. The motor wedging collars 24, 26 are attached to the bearing mounts 32, 34 by arrays of cap screws 28. Wedging collar retract screws 29 are threadingly engaged to the wedging collars and push against the flat end surfaces of the bearing mounts 32, 34. The use of wedging collars 24, 26 in the mounting configuration is very effective in providing firm contact between internal components and the wall of the housing 22. Such wedging collars 24, 26 are easily removed by the array of backoff screws 29, mounted in the mating threads in the ends of the wedging collars 24, 26. The design of the wedging collars for both the motors and the epicyclic eccentric weight systems are discussed in further detail in FIG. 4A and 4B.

A flexible shaft 42, made from a composite material to withstand high frequency flexing and torque, connects the motor shaft subassembly 30 to the epicyclic eccentric weight systems 44 and 46.

Figure 2:
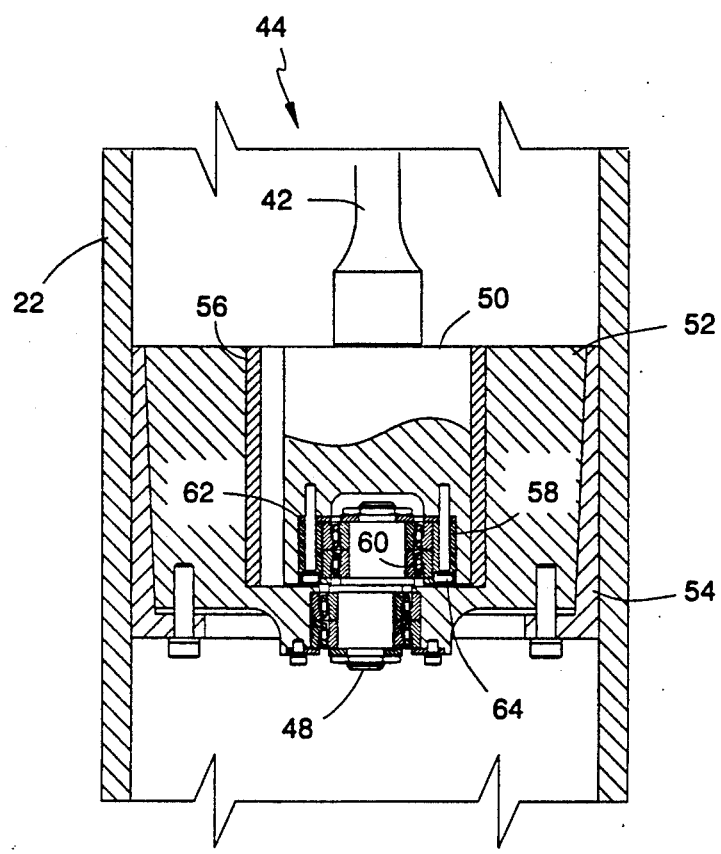
FIG. 2 is a vertical cross-section of the lower portion of the orbital seismic source of FIG. 1 showing an epicyclic eccentric weight system.

FIG. 2 illustrates the epicyclic eccentric weight system 44. A bearing mounted crank 48 is captured in the lower end of a cylindrical roller 50 and then captured in the lower end of a roller mounting block 52, which is in turn, held firmly in contact with the wall of the cylindrical housing 22 by an expandable wedging collar 54. The roller mounting block 52, is made of a strong light weight material such as aluminum or a composite solid, and has a hollow cylindrical cavity formed along its axis.

A hardened cylindrical liner or sleeve 56 is pressed or bonded into the cylindrical cavity. The inside of this liner 56 is concentric with the cavity and has a finished surface like that of the races of high speed rolling element bearings. The cylindrical roller 50 has a outside diameter which is smaller than the inside diameter of the cylindrical liner 56. Its surface is likewise very hard and finished like the races of the rolling elements of bearings. The roller 50 and the cylindrical liner 56 may be made from a high strength alloy steel or a ceramic material like that used in modern high speed rolling element bearings. The retainer sleeve 58 which captures the bearings 60 in the bottom of the cylindrical roller 50 may be made from urethane of 90 or higher durometer. A second sleeve or washer 62 of a light material is located at the top of the bearings 60 in the cylindrical roller 50. Machine screws 64 pass through holes in the sleeves 60 and washers 62 and engage mating threaded holes in the cylindrical roller 50 to hold the bearings 60 firmly in place.

The purpose of the urethane (or other suitable material) sleeve 58 is to allow a relatively small predetermined preload to be applied between the surfaces of the cylindrical roller 50 and liner 56 to assure that these two surfaces are initially in rolling contact at the start of relative rotation of the cylindrical roller 50. As the rolling speed increases, centrifugal action will maintain and increase the force between the roller 50 and the liner 56 and will at least partially relieve the preload stress in the urethane sleeve 58.

As shown in FIG. 2, the axis of the cylindrical roller 50 is offset from the center line of the motor 20 and roller mounting block 52. This offset is the eccentricity of the roller 50. A flexible shaft 42, made from a composite material to withstand high frequency flexing and torque, connects the motor shaft assembly 30 to the cylindrical roller 50 at the center line of the roller 50. The flexible shaft 42 interconnects the centerline of the roller 50 and the motor shaft assembly 30 whereby the roller 50 receives the rotational output from the motor 20. The shaft 42 rotates in one direction and the roller 50 rotates in the opposite direction thereby producing an epicyclic motion.

As long as the radius of the roller 50 is greater than one half the inside radius of the cylindrical liner 56, the orbital frequency of the center line of the roller 50 about the center line of the motor 20, will be greater in magnitude than the magnitude of the frequency of rotation of the roller 50 with respect to the motor frame 36. That is, a frequency multiplying factor exists which is a function of the geometry of the epicyclic system. The frequency ratio of output to input can be expressed mathematically by:

$$\frac{F_o}{F_i} = \frac{R1}{(R2 - R1)}$$

where
$F_i$ = motor frequency,
$F_o$ = orbital frequency of the roller,
$R1$ = roller radius, and
$R2$ = liner inside radius.

This concept allows higher torque, lower speed motors which typically generate less heat to be used to drive orbital seismic sources at high frequencies. Radial loads, which are carried by rolling element bearings in the bearing mounted rotor concepts, are carried by the large cylindrical roller in contact with the cylindrical liner. The length of the roller and liner can be made relatively long to reduce the pressure along the line of contact between these two elements.

Small, high speed bearings are used for mounting the crank because only relatively small radial loads are applied to these bearings. It must be realized that the cylindrical roller 50 and liner 56 form a pair of high speed rolling bearing elements and must be very accurately formed to prevent the types of damage which can occur in state of the art bearings.

Figure 3:
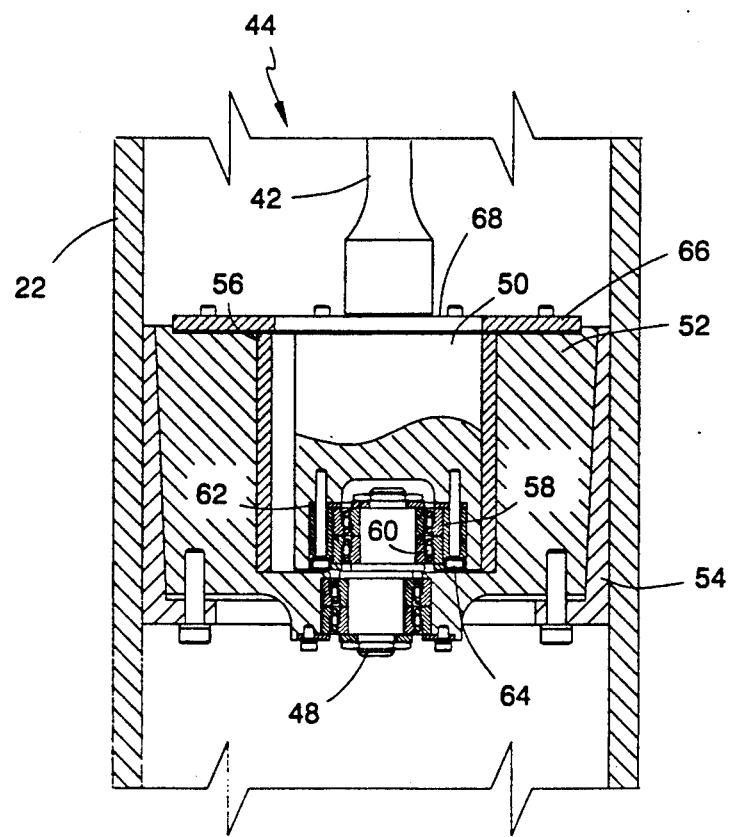
FIG. 3 is a vertical cross-section illustrating an alternative form of epicyclic eccentric weight system.

An optional epicyclic eccentric weight system is illustrated in FIG. 3. In this optional system, an internal gear 66 and a spur gear 68 are shown attached to the tops of the roller mounting block 52 and the cylindrical roller 50, respectively. The pitch circles of the internal gear 66 and the spur gear 68 are concentric with the inside circumference of the cylindrical liner 56 and the outside circumference of the cylindrical roller 50, respectively. The purpose of this gear pair is to assure continuous rolling action between the roller 50 and the liner 56. Since the roller 50 and the liner 56 carry the centrifugal force, the gear pair would be lightly loaded.

Figure 4A:
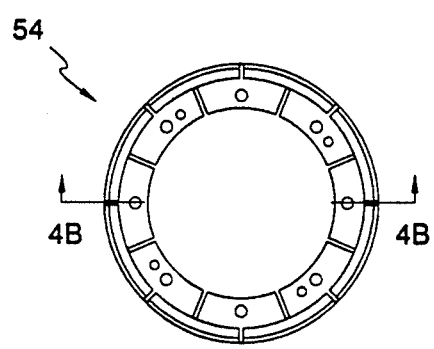
FIG. 4A is a vertical cross-section illustrating the expandable wedging collars.
Figure 4B:
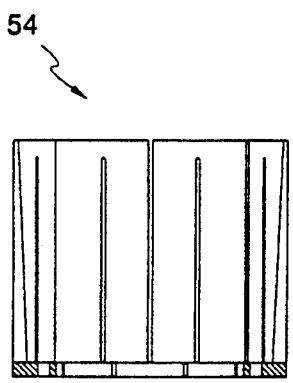
FIG. 4B is a section taken along lines 4B-4B of FIG. 4A.

FIGS. 4A and 4B illustrate the expandable tapered wedging collars used for both the epicyclic eccentric weight systems 44, 46 and the motor 20. The expandable wedging collar 54 for epicyclic eccentric weight system 44 is illustrated in detail. The tapered wedging collar 54 engages a matching tapered portion of the roller mounting block 52 of the epicyclic eccentric weight system 44. While the inner surface of each wedging collar is tapered at one end, the outer surface is cylindrical. Also each wedge has apertures at the smaller tapered end defining a plurality of parallel, axially aligned, longitudinal slits. Each wedging collar can be made to expand by tightening an array of cap screws which are threadingly engaged with the bottom end of the roller mounting blocks in the case of the epicyclic eccentric weight systems or the outer end of the motor shell 36. A separate array of back off cap screws (not shown) are threadingly engaged with the outer ends of each wedging collar. The wedging collars can be retracted by tightening the array of back off cap screws when the cap screws used for expanding the wedging collars are loosened. A thread sealant is applied to all threaded fasteners to prevent loosening under the vibratory action caused by the spinning unbalanced epicyclic eccentric weight system.

As shown in FIGS. 1 and 2, the enlarged detail is symmetric about a horizontal plane through the center of the motor 20. The motor 20, flexible shaft 42, and the two epicyclic orbital systems 44 and 46 may be preassembled and then inserted into the cylindrical housing 22 in a cartridge type subassembly. Access holes (not shown) can be formed parallel to the center line of the housing 22 to allow long wrenches to reach the screw heads which tighten the expanding wedging collars 24 and 26 of the motor 20. The two orbital epicyclic eccentric systems 44 and 46 are located at the bending nodes of the assembled source vibrating at its fundamental frequency.

The end caps 70 and 72 shown in FIG. 1 also serve as mounts for motion sensors 74 and 76 such as geophones, or accelerometers whose output signals are used for cross correlation purposes in a manner like that of existing rotary sources. The motor 20 is reversible and can be driven in either direction. A microprocessor based ramp generator and control system, located either at the surface or downhole, may be used to provide the predetermined ramp up and ramp down input to the vibrator motor. The motor speed is ramped up to some maximum and then immediately ramped down to a stop. Direction of motor rotation is then reversed and the process repeated to complete a mirror image pair of sweeps necessary for extracting shear and compression wave components during the data processing operation.

While the concepts shown in the attached figures uses dual orbital systems, a single orbital system could be used in other types of seismic vibrators such as might be used on the surface of the earth or in a marine shear wave vibrator. It should also be realized that the principles used in the concept of this present invention could also be used in vibratory devices for applications other than seismic sources.

Changes may be made in combination and arrangement of elements as heretofore set forth in the specification and shown in the drawings; it being understood that changes may be made in the embodiments disclosed without departing from the spirit and scope of the invention as defined in the following claims.

What is claimed is:

1. A downhole seismic source for the simultaneous generation of elliptically polarized shear wave seismic energy and compression wave seismic energy in a borehole comprising:
   a substantially cylindrical housing having a central axis and two ends;
   a drive means disposed in said cylindrical housing providing rotational output;
   at least one epicyclic eccentric weight system disposed in said cylindrical housing and receiving said rotational output wherein said epicyclic eccentric weight system includes a cylindrical roller mounting block having a cylindrical cavity formed along its longitudinal axis;
   a cylindrical sleeve bonded inside said cylindrical cavity;
   a cylindrical roller slidably disposed within said sleeve and having an outside diameter smaller than the inside diameter of said cylinder sleeve;
   a crank interconnecting the lower end of said cylindrical roller and said roller mounting block;
   a flexible shaft interconnecting the centerline of said cylindrical roller and said drive means whereby said roller receives said rotational output and whereby as said shaft rotates in one direction said roller rotates in the opposite direction; and
   a cable support means supporting said cylindrical housing at selected positions along said borehole.

2. A downhole seismic source as set forth in claim 1 further including:
   an expandable tapered wedging collar firmly securing said epicyclic eccentric weight system within said cylindrical housing; and
   an expandable tapered wedging collar firmly securing said drive means within said cylindrical housing.

3. A downhole seismic source as set forth in claim 2 wherein said expandable tapered wedging collars further include:
   a tapered inner surface and a substantially cylindrical outer surface whereby said wedging collar becomes progressively smaller at one end;
   apertures in said smaller tapered end of said wedging collar defining a plurality of parallel, axially aligned, longitudinal slits;
   a plurality of screws located at the larger end of said wedging collar whereby said wedging collar may be expanded or contracted.

4. A downhole seismic source for the simultaneous generation of elliptically polarized shear wave seismic energy and compression wave seismic energy in a borehole comprising:
   a substantially cylindrical housing having a central axis and two ends;
   a drive means disposed in said cylindrical housing providing rotational output;
   an expandable tapered wedging collar firmly securing said drive means within said cylindrical housing;
   at least one epicyclic eccentric weight system disposed in said cylindrical housing and receiving said rotational output;
   an expandable tapered wedging collar firmly securing said epicyclic eccentric weight system within said cylindrical housing; and
   a cable support means supporting said cylindrical housing at selected positions along said borehole.

5. A downhole seismic source for the simultaneous generation of elliptically polarized shear wave seismic energy and compression wave seismic energy in a borehole comprising:
   a substantially cylindrical housing having a central axis and two ends;
   a drive means disposed in said cylindrical housing providing rotational output;
   at least one epicyclic eccentric weight system disposed in said cylindrical housing and receiving said rotational output and including a cylindrical roller mounting block having a cylindrical cavity formed along its longitudinal axis, a cylindrical sleeve bonded inside said cylindrical cavity, a cylindrical roller slidably disposed within said sleeve and having an outside diameter smaller than the inside diameter of said cylindrical sleeve, a crank interconnecting the lower end of said cylindrical roller and said roller mounting block, and a flexible shaft interconnecting the centerline of said cylindrical roller and said drive means whereby said roller receives said rotational output and whereby as said shaft rotates in one direction said roller rotates in the opposite direction; and a cable support means supporting said cylindrical housing at selected positions along said borehole.

6. A downhole seismic source for the simultaneous generation of elliptically polarized shear wave seismic energy and compression wave seismic energy in a borehole comprising:

a substantially cylindrical housing having a central axis and two ends;

a drive means disposed in said cylindrical housing providing rotational output;

an expandable tapered wedging collar firmly securing said drive means within said cylindrical housing;

at least one epicyclic eccentric weight system disposed in said cylindrical housing and receiving said rotational output and including a cylindrical roller mounting block having a cylindrical cavity formed along its longitudinal axis, a cylindrical sleeve bonded inside said cylindrical cavity, a cylindrical roller slidably disposed within said sleeve and having an outside diameter smaller than the inside diameter of said cylindrical sleeve, a crank interconnecting the lower end of said cylindrical roller and said roller mounting block, and a flexible shaft interconnecting the centerline of said cylindrical roller and said drive means whereby said roller receives said rotational output and whereby as said shaft rotates in one direction said roller rotates in the opposite direction;

an expandable tapered wedging collar firmly securing said epicyclic eccentric weight system within said cylindrical housing; and a cable support means supporting said cylindrical housing at selected positions along said borehole.

* * * * *